United States Patent [19]

Desmond et al.

[11] Patent Number: 4,585,640

[45] Date of Patent: Apr. 29, 1986

[54] SYNTHESIS OF MOLECULAR SIEVING HIGH SILICA MORDENITE USING SYNTHESIS DIRECTING ORGANIC DYES

[75] Inventors: Michael J. Desmond, Cleveland Hts.; Frederick A. Pesa, Aurora; Janie K. Currie, Novelty, all of Ohio

[73] Assignee: The Standard Oil Company, Cleveland, Ohio

[21] Appl. No.: 672,403

[22] Filed: Nov. 16, 1984

[51] Int. Cl.$^4$ .................. C01B 33/28; B01J 29/18
[52] U.S. Cl. .................. 423/329; 423/328; 502/77; 502/78
[58] Field of Search .................. 502/78; 423/328, 329

[56] References Cited

U.S. PATENT DOCUMENTS

| | | | |
|---|---|---|---|
| 4,018,870 | 4/1977 | Whittam | 423/329 |
| 4,060,590 | 11/1977 | Whittam et al. | 423/118 |
| 4,205,052 | 5/1980 | Rollman et al. | 423/329 |
| 4,388,285 | 6/1983 | Rankel et al. | 423/329 |
| 4,397,825 | 8/1983 | Whittam | 423/277 |
| 4,414,189 | 11/1983 | Kokotailo et al. | 423/328 |
| 4,483,835 | 11/1984 | Zones | 423/277 |
| 4,500,503 | 2/1985 | Rankel et al. | 423/329 |

FOREIGN PATENT DOCUMENTS 0040104  11/1981  European Pat. Off. ............ 423/328

OTHER PUBLICATIONS

*The Merck Index*, 8th Edition, Merck & Co. Inc., Rahway, N.J., 1968, p. 687.

*Primary Examiner*—John Doll
*Assistant Examiner*—Jackson Leeds
*Attorney, Agent, or Firm*—Larry W. Evans; Joseph G. Curatolo; Sue E. McKinney

[57] ABSTRACT

A method is disclosed for making molecular sieving high silica mordenite comprising the steps of:

(A) providing a mixture comprising: water; an oxide of silicon source; an oxide of aluminum source; a mineralizing agent; and a synthesis directing nitrogen containing organic dye; and (B) maintaining said mixture at a temperature of about 80° C. to about 300° C. for an effective period of time to provide said mordenite.

33 Claims, No Drawings

SYNTHESIS OF MOLECULAR SIEVING HIGH SILICA MORDENITE USING SYNTHESIS DIRECTING ORGANIC DYES

TECHNICAL FIELD

This invention relates to molecular sieves and, more particularly, to molecular sieving mordenite. Specifically, this invention relates to a method for making molecular sieving mordenite using nitrogen containing organic dyes as synthesis directing agents.

BACKGROUND OF THE INVENTION

The term "molecular sieve" refers to a wide variety of positive ion containing crystalline materials of both natural and synthetic varieties which exhibit the property of acting as sieves on a molecular scale. A major class of molecular sieves are crystalline aluminosilicates, although other crystalline materials are included in the broad definition. Examples of such other crystalline materials include coal, special active carbons, porous glass, microporous beryllium oxide powders, and layer silicates modified by exchange with organic cations. See, D. W. Breck, "Zeolite Molecular Sieves: Structure, Chemistry, and Use", John Wiley & Sons, 1974.

Zeolites are crystalline, hydrated, framework aluminosilicates which are based on a three-dimensional network of $AlO_4$ and $SiO_4$ tetrahedra linked to each other by sharing all of the oxygens.

Zeolites may be represented by the empirical formula

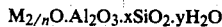

$$M_{2/n}O.Al_2O_3.xSiO_2.yH_2O$$

wherein, x is generally equal to or greater than 2 since $AlO_4$ tetrahedra are joined only to $SiO_4$ tetrahedra, and n is the cation valence. The framework contains channels and interconnected voids which are occupied by the cation, M, and water molecules. The cations may be mobile and exchangeable, to varying degrees, by other cations. Intracrystalline zeolitic water in many zeolites is removed continuously and reversibly. In many other zeolites, mineral and synthetic, cation exchange or dehydration may produce structural changes in the framework. Ammonium and alkylammonium cations may be incorporated in synthetic zeolites, e.g., $NH_4$, $CH_3NH_3$, $(CH_3)_2NH_2$, $(CH_3)_3NH$, and $(CH_3)_4N$. In some synthetic zeolites, aluminum cations may be substituted by gallium ions and silicon ions by germanium or phosphorus ions. The latter necessitates a modification of the structural formula.

The structural formula of a zeolite is best expressed for the crystallographic unit cell as: $M_{x/n}[(AlO_2)_x(SiO_2)_y].wH_2O$ where M is the cation of valence n, w is the number of water molecules and the ratio y/x usually has values of 1-100 depending upon the structure. The sum (x+y) is the total number of tetrahedra in the unit cell. The complex within the [] represents the framework composition.

Mordenite is a form of zeolite that occurs naturally and has been prepared synthetically. A typical formula for mordenite in terms of oxides is as follows:

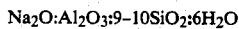

$$Na_2O:Al_2O_3:9-10SiO_2:6H_2O$$

The framework structure typically consists of chains of 5 rings cross linked by 4 rings. The chains consist of 5 rings of $SiO_4$ tetrahedra and single $AlO_4$ tetrahedra. Mordenite can be in the form of small port or large port and is characterized by a relatively high degree of thermal stability. See, D. W. Breck, Supra, which is incorporated herein for its teaching with respect to mordenite.

The term "high silica mordenite" is used herein to refer to a mordenite structure characterized by a Si/Al mole ratio in excess of 5. The literature of molecular sieves suggests that it is not possible to make high silica mordenite by a method that is direct and efficient.

Synthesis directing agents are agents which when added to a reaction mixture effect a different crystalline structure than that which would occur but for the addition of such agent, or result in the formation of a crystalline structure wherein an amorphous mixture would otherwise remain. Examples of conventional agents that are currently in use include ammonium and tetrapropyl ammonium ions, and alkyl phosphonium and alkyl arsonium ions. See, L. D. Rollman, "Templates in Zeolite Crystallization", Adv. Chem. Ser., 173, 387 (1979).

U.S. Pat. No. 4,018,870 discloses the use of certain nitrogen containing dyes including methyl violet and methylene blue in the synthesis of zeolites. This patent indicates that these dyes are used to suppress the formation of unwanted zeolites during the manufacture of more desirable products.

It would be advantageous to provide a method for making high silica mordenite that is both direct and efficient.

SUMMARY OF THE INVENTION

The present invention relates to a method for making molecular sieving high silica mordenite that is both direct and efficient. Broadly stated, the present invention contemplates the provision of a method for making molecular sieving high silica mordenite comprising the steps of:

(A) providing a mixture comprising: water; an oxide of silicon source; an oxide of aluminum source; a mineralizing agent, and a synthesis directing nitrogen containing organic dye; the mole ratio of Si/Al in said mixture being at least about 5, and (B) maintaining said mixture at a temperature of about 80° C. to about 300° C. for an effective period of time to provide said mordenite.

DETAILED DESCRIPTION OF THE PREFERRED EMBODIMENT

The mixture provided for in step (A) of the process of the invention is preferably prepared in three steps. First, the oxide of silicon source is mixed in water to provide a first mixture. This first mixture is preferably a colloidal dispersion of silica. Second, the nitrogen containing organic dye is mixed with water to provide a second mixture. This second mixture is usually in the form of a dispersion or solution. The oxide of aluminum source is added to the second mixture, then the mineralizing agent is added to the second mixture. Third, these first and second mixtures are mixed together to form a third mixture.

This third mixture, which is in the form of a gel, is the mixture called for in step (A) of the inventive method. Stirring or agitation is generally required to effect a homogeneous mixture. The $OH^-$ to Si mole ratio is preferably in the range of about 0.1 to about 10. The $H_2O$ to $OH^-$ mole ratio is preferably in the range of about 10 to about 1000. The Si/Al mole ratio is at least about 5, preferably in the range of about 5 to about 50, more preferably from about 6 to about 20. The Si to mineralizing agent mole ratio is preferably in the range of about 0.1 to about 50. The Si to organic dye mole ratio is in the range of about 5 to about 100, preferably about 10 to about 60.

The oxide of silicon source can be any source that provides silicon oxide, hydroxide or alkoxide. Such sources include silica gel, silicic acid, silica sol and the silicates. Included within the silicates are the alkali and alkaline earth metal silicates with sodium silicate and potassium silicate being preferred. The alkoxides include those alkoxides of up to about 10, preferably up to about 6 carbon atoms. The silica sols are aqueous colloidal dispersions containing colloidal silica particles. The solids content of these colloidal dispersions generally ranges up to about 70% by weight, and is preferably in the range of about 5% to about 50%. These dispersions usually include an effective amount of an anionic (e.g., acetate, halogen, etc.) or cationic (e.g., alkali metal, ammonium, etc.) stabilizing agent to stabilize the dispersion. Generally the level of addition of such stabilizing agents is up to about 10% by weight of the solids in the dispersion. A commercially available silica sol that is particularly useful is Ludox AS-40 which is a product of DuPont identified as an ammonium stabilized silica sol containing 40% by weight silica.

The oxide of aluminum source can be any aluminum source that provides an oxide, hydroxide or alkoxide of aluminum. The alkoxides include those alkoxides of up to about 10 carbon atoms, preferably up to about 6 carbon atoms. Examples of such sources include sodium aluminate, alumina, aluminum trihydrate and aluminum hydroxide gel.

The mineralizing agent is an alkali or alkaline earth metal compound. These compounds include the oxides, hydroxides, inorganic salts (e.g., nitrates, phosphates, halides, carbonates, silicates, aluminates and the like) as well as the organic salts, (e.g., acetates, formates, butyrates, propionates, benzylates and the like). A preferred mineralizing agent is sodium hydroxide.

The synthesis directing nitrogen containing organic dye can be an oxide, hydroxide, inorganic salt (e.g., nitrates, phosphates, halides, carbonates, silicates, aluminates and the like) or organic salt (e.g., acetates, formates, butyrates, propionates, benzylates and the like). The dye cations are aromatic in character, generally have a planar geometry, and have a cationic charge of +1 or +2. Examples of such dyes include methyl green, ethyl green, methyl violet, methyl violet 2B and the viologens. The viologens include methyl viologen, ethyl viologen, benzyl viologen, and betaine viologen.

In a preferred embodiment the synthesis directing dye is represented by the formula

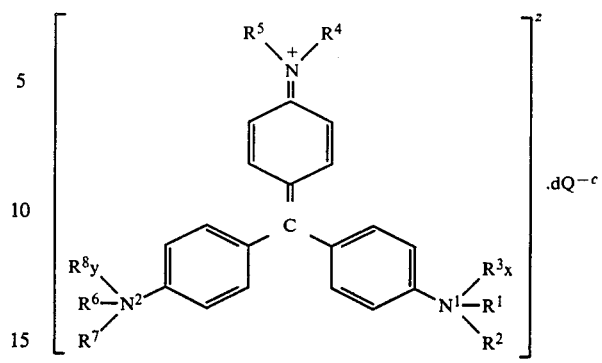

wherein: $N^1$ has a charge of $+1$ or a neutral charge; $N^2$ has a charge of $+1$ or a neutral charge; x is zero when $N^1$ has a neutral charge, and is 1 when $N^1$ has a $+1$ charge; y is zero when $N^2$ has a neutral charge, and is 1 when $N^2$ has a $+1$ charge; $R^1$, $R^2$, $R^3$, $R^4$, $R^5$, $R^6$ and $R^7$ are independently hydrogen or alkyl groups of 1 to about 10 carbon atoms; z is $1+x+y$; Q is an anion of charge c; and d is z/c. $R^1$, $R^4$, $R^5$ and $R^6$ are preferably methyl. $R^2$ and $R^7$ are preferably independently hydrogan, methyl or ethyl. $R^3$ and $R^8$ are preferably methyl. Q is preferably a halide, phosphate, nitrate, carbonate, acetate, formate or butyrate. Alternatively Q is represented by the formula $EX_4$ wherein E is selected from the group consisting of Al, Zn, Cd, Hg, Ga, Pd, Pt, Fe, Cr, Mn, Co or Ni, and X is selected from the group consisting of Cl, F, Br, I or CN. An example of such a dye is methyl green.

In another preferred embodiment the synthesis directing dye is the salt of a cation of the formula

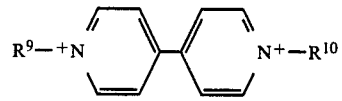

wherein $R^9$ and $R^{10}$ are independently hydrocarbon groups of 1 to about 10 carbon atoms. Either or both $R^9$ and $R^{10}$ can be independently aliphatic (e.g., alkyl of 1 to about 10 carbon atoms, preferably methyl) or aromatic (e.g., benzyl). The anionic portion of such salt can be halide, phosphate, nitrate, carbonate, acetae, formate or butyrate. An example of such a dye is methyl viologen.

In the method of the present invention, the mixture provided for in step (A) containing water; the oxide of silicon source; the oxide of aluminum source; mineralizing agent; and synthesis directing organic dye, is in the form of a gel. This gel is thoroughly mixed to homogenize the gel and placed in a reactor. The reactor is preferably an enclosed reactor (e.g., a static bomb style reactor). The contents are heated to a temperature in the range of about 80° C. to about 300° C., preferably about 100° C. to about 200° C., for an effective period of time to form said mordenite, preferably for about one to about 100 days, more preferably about 10 to about 50 days. The pressure within the reactor is preferably at at least the vapor pressure of water at the temperature of the reactor contents. The contents of the reactor are then allowed to cool to room temperature. The crystalline solids are separated from the mother liquid and washed thoroughly with water. Separation can be effected by conventional filtration techniques. The solids can also be washed with an organic solvent, e.g., acetone. The crystalline solids are then allowed to dry in air, such solids being the desired molecular sieving mordenites of the invention.

The molecular sieving high silica mordenites that are made by the process of the invention can be represented in terms of mole ratios of oxides by the formula:

$$aAO_{n/2}:dMO_{m/2}:xNa_2O:Al_2O_3:ySiO_2:zH_2O$$

wherein
- A is the cation of said synthesis directing organic dye;
- M is selected from the group consisting of Zn, Cd, Hg, Ga, Pd, Pt, Fe, Cr, Mn, Co, Ni or a mixture of two or more thereof;
- a is from zero to about 1, preferably from zero to about 0.2;
- d is from zero to about 1, preferably from about 0.05 to about 1, more preferably from about 0.1 to about 0.5;
- x is from about 0.5 to about 2, preferably from about 0.8 to about 1.5;
- y is from about 10 to about 100, preferably from about 12 to about 40; and
- z is from zero to about 20.

These molecular sieving high silica mordenites have X-ray diffraction patterns which exhibit the following significant lines:

| Interplanar Spacing d(A) | Relative Intensity |
|---|---|
| 13.6 ± 0.2 | m. |
| 10.2 ± 0.15 | w.-m. |
| 9.10 ± 0.10 | s. |
| 6.60 ± 0.10 | s. |
| 6.35 ± 0.08 | w.-m. |
| 6.04 ± 0.08 | w. |
| 5.80 ± 0.06 | w.-m. |
| 5.02 ± 0.05 | w. |
| 4.52 ± 0.05 | m.-s. |
| 3.99 ± 0.05 | m.-s. |
| 3.85 ± 0.05 | w.-m. |
| 3.75 ± 0.05 | w.-m. |
| 3.47 ± 0.04 | v.s. |
| 3.39 ± 0.04 | s. |
| 3.21 ± 0.04 | m.-s. |
| 2.88 ± 0.03 | m. |
| 2.51 ± 0.02 | w. |

The values were determined by standard techniques. The relative intensities are given in terms of symbols: v.s.=very strong, s.=strong, m=medium, and w.=weak.

The molecular sieving mordenites can optionally be heat treated at a temperature of about 300° C. to about 900° C., preferably about 400° C. to about 600° C. in an inert, oxidizing or reducing atmosphere for a sufficient time to pyrolyze any synthesis directing agent intermixed with such molecular sieving mordenites. The time period for this heat treating step is dependent upon the mass of material being treated. Preferably the heat treating step is conducted for at least about 30 minutes, but this time period can be more or less than 30 minutes depending upon the mass of material being treated. The inert atmosphere is preferably nitrogen, argon, helium or neon. The reducing atmosphere is hydrogen or a mixture of hydrogen and one of the above-indicated inert gases. The reducing atmosphere can thus contain from about 1% to about 100% hydrogen, preferably about 1% to about 20% hydrogen, with the remainder being inert gas. The oxidizing atmosphere can be oxygen or a mixture of oxygen and one of the above-indicated inert gases. The oxidizing atmosphere can thus contain from about 1% to about 100% oxygen, preferably from about 1% to about 20% oxygen with the remainder being inert gas. A preferred oxidizing atmosphere is air.

The molecular sieving mordenites of the invention can be cation exchanged with an ammonium salt or the salt of a catalytically active metal. The salt of the catalytically active metal is preferably the salt of a Group VIII, IB or IIB metal, with zinc, copper, nickel, cobalt and iron being preferred. The anionic portions of these salts are preferably inorganic and include the nitrates, phosphates, carbonates and halides. The cation exchange procedure employed herein is entirely conventional. Briefly, the mordenite and the ammonium salt or salt of catalytically active metal are dispersed in water for a few minutes to several hours, preferably about one to about ten hours, and maintained at about room temperature to about the boiling point of the water, then filtered and washed, with the result being the formation of the cation-exchanged molecular sieving mordenite. This procedure can be carried out once or repeatedly depending on the degree of exchange desired.

Optionally, the cation-exchanged molecular sieving mordenite can be heat treated in an inert, oxidizing or reducing atmosphere using the heat treating procedures described above to convert the cation-exchanged species to a more active form. This heat treating procedure is particularly suitable for driving off ammonia from an ammonium molecular sieving mordenite to convert such molecular sieving mordenite to the acid form.

An advantage of the present invention is that the organic dyes employed herein do not tend to occlude within the molecular sieving mordenites produced herein. Thus the use of heat treating procedures to pyrolize the dye can be avoided. Since these organic dyes are relatively stable under the synthesis conditions employed herein and thus do not undergo significant breakdown during synthesis, it is possible to recycle these dyes or use them as "catalysts" in continuous processes.

The molecular sieving high silica mordenites of the present invention can be used in many of the known applications for mordenites. They are particularly suitable as adsorbents.

In order to further illustrate the present invention, the following examples are provided. Unless otherwise indicated, in the following examples as well as throughout the specification and in the claims, all parts and percentages are by weight, and all temperatures are in degrees centigrade.

EXAMPLE 1

20.4 parts of Ludox AS-40 were added to a polypropylene beaker to provide a first mixture. 1.34 parts of methyl violet 2B were mixed with 6.7 parts of water with stirring in another polypropylene beaker to form a second mixture. 1.45 parts of NaAlO$_2$.1.5H$_2$O were added with stirring to the second mixture. 2.13 parts of a 50% sodium hydroxide solution were added with stirring to the second mixture. The two mixtures were mixed together with the result being the formation of a gel. The gel was stirred to homogenize the gel. The Si/Al mole ratio was 10.22. The Si/Na mole ratio was 5.11. The Si to methyl violet 2B mole ratio was 40. Two 9.7 part samples of the gel were placed in Teflon-lined stainless steel bombs. The bombs were placed in an oven at a temperature of 150° C. The bombs were removed after 21 days and 35 days. The crystalline solids were separated from the mother liquor by filtering. The solids were washed in water and acetone to remove excess dye, then dried in air. The crystalline samples had a mordenite structure. The crystalline samples had the following elemental analysis: 32% Si; 3.7% Al; and 3.4% Na. The mole ratios for these crystalline samples were: $Si/Al=8.14$; $SiO_2/Al_2O_3=16.28$; $Si/Na=7.60$; and $SiO_2/Na_2O=15.20$. These crystalline samples exhibited the following X-ray diffraction pattern:

| Interplanar Spacing d(A) | Relative Intensity |
| --- | --- |
| 13.75 | m. |
| 10.20 | w. |
| 9.15 | s. |
| 6.61 | s. |
| 6.39 | m. |
| 6.08 | w. |
| 5.82 | m. |
| 5.05 | w. |
| 4.53 | m. |
| 3.99 | m. |
| 3.86 | w. |
| 3.75 | m. |
| 3.47 | v.s. |
| 3.39 | s. |
| 3.22 | s. |
| 2.89 | m. |
| 2.51 | w. |

EXAMPLE 2

The crystalline solids from Example 1 were heat treated in air at 500° C. for four hours. The X-ray diffraction pattern of the heat treated sample exhibited the following significant lines (3°–40°):

| Interplanar Spacing d(A) | Relative Intensity |
| --- | --- |
| 13.61 | m. |
| 10.19 | m. |
| 9.06 | s. |
| 6.58 | s. |
| 6.36 | m. |
| 6.04 | w. |
| 5.79 | m. |
| 5.02 | w. |
| 4.51 | m. |
| 3.98 | s. |
| 3.84 | m. |
| 3.74 | m. |
| 3.66 | w. |
| 3.52 | w. |
| 3.46 | v.s. |
| 3.38 | s. |
| 3.21 | m. |
| 3.14 | w. |
| 2.93 | w. |
| 2.88 | m. |
| 2.69 | w. |
| 2.55 | w. |
| 2.51 | w. |
| 2.45 | w. |

EXAMPLE 3

15.2 parts of Ludox AS-40 were added to a polypropylene beaker to provide a first mixture. 0.95 parts of methylene blue were mixed with 5 parts of water in another polypropylene beaker to form a second mixture. 1.09 parts of $NaAlO_2.1.5H_2O$ were added with stirring to the second mixture. 1.60 parts of a 50% sodium hydroxide solution were added to the second mixture. The two mixtures were combined with the result being the formation of a gel. The gel was homogenized by stirring. The $SiO_2$ to methylene blue mole ratio was 19.8. The $SiO_2$ to Al mole ratio was 10.12. The $SiO_2$ to water mole ratio was 0.159. The $SiO_2$ to Na mole ratio was 3.37. Two 9 part samples of the gel were placed in Teflon lined stainless steel bombs. The bombs were placed in an oven at a temperature of 150° C. The samples were removed after 14 and 28 days. The solids were removed from the mother liquor by filtering. The solids were washed in water and acetone to remove excess dye, then dried in air. The solids from the sample recovered after 14 days contained about 40% crystalline material which had a mordenite structure with the balance of the material being non-crystalline as determined by X-ray diffraction. The 28-day sample contained crystalline mordenite in excess of 90% and exhibited the following significant lines in its X-ray diffraction pattern (3°–40°):

| Interplanar Spacing d(A) | Relative Intensity |
| --- | --- |
| 13.6 | m. |
| 10.25 | w. |
| 9.1 | s. |
| 6.60 | s. |
| 6.40 | w. |
| 6.08 | w. |
| 5.80 | w. |
| 5.00 | w. |
| 4.52 | m. |
| 4.17 | w. |
| 4.00 | s. |
| 3.84 | w. |
| 3.76 | w. |
| 3.63 | w. |
| 3.53 | w. |
| 3.47 | v.s. |
| 3.39 | s. |
| 3.22 | m. |
| 3.11 | w. |
| 2.94 | w. |
| 2.89 | m. |
| 2.70 | w. |
| 2.56 | w. |
| 2.52 | w. |
| 2.46 | w. |

EXAMPLE 4

The crystalline solids recovered from the 28-day sample of Example 3 were dried and heat treated in air for four hours at 500° C. The elemental analysis of the heat treated sample was as follows: 41% Si; 3.5% Al; and 3.8% Na. The mole ratios were: $Si/Al=11.2$; $SiO_2/Al_2O_3=22.4$; $Si/Na=10.4$; and $SiO_2/Na_2O=20.8$.

EXAMPLE 5

15.2 parts of Ludox AS-40 were added to a polypropylene beaker to provide a first mixture. 0.66 parts of methyl viologen were mixed with 5 parts of water in another polypropylene beaker to form a second mixture. 1.09 parts of $NaAlO_2.1.5H_2O$ were added with stirring to the second mixture. 1.60 parts of a 50% sodium hydroxide solution were added to the second mixture. The two mixtures were combined resulting in the formation of a gel. The gel was homogenized by stirring. The $SiO_2$ to methyl viologen mole ratio was 19.8. The SiO₂ to Al mole ratio was 10.12. The SiO₂ to water mole ratio was 0.159. The SiO₂ to Na mole ratio was 3.37. The gel was placed in a Teflon lined stainless steel bomb. The bomb was placed in an oven at a temperature of 150° C. The sample was removed after 42 days. The solids were removed from the mother liquor by filtering. The solids were washed in water and in acetone to remove excess dye, then dried in air. The solids had a mordenite structure. The crystalline solids had the following elemental analysis: 32% Si; 3.5% Al; and 3.2% Na. The mole ratios for the sample were: Si/Al=8.8; SiO₂/Al₂O₃=17.61; Si/Na=8.2; and SiO₂/Al₂O₃=16.4. Carbon and nitrogen analysis indicated a residual dye content of 1.47%, corresponding to a Si/dye mole ratio of 200 or 0.23 methyl viologen molecules per unit cell of mordenite. The crystalline solids exhibited the following X-ray diffraction pattern:

| Interplanar Spacing d(A) | Relative Intensity |
| --- | --- |
| 13.55 | m. |
| 10.23 | m. |
| 9.07 | s. |
| 6.56 | s. |
| 6.37 | m. |
| 6.04 | w. |
| 5.79 | m. |
| 4.99 | w. |
| 4.51 | s. |
| 4.13 | w. |
| 3.98 | s. |
| 3.83 | m. |
| 3.75 | m. |
| 3.64 | w. |
| 3.53 | m. |
| 3.46 | v.s. |
| 3.38 | s. |
| 3.22 | m. |
| 3.19 | m. |
| 2.94 | w. |
| 2.89 | m. |
| 2.70 | w. |
| 2.55 | w. |
| 2.51 | m. |
| 2.45 | w. |

EXAMPLE 6

20.4 parts of Ludox AS-40 were added to a polypropylene beaker to provide a first mixture. 2.07 parts of methyl green zinc chloride salt were mixed with 6.7 parts of water in another polypropylene beaker to form a second mixture. 1.45 parts of NaAlO₂.1.5H₂O were added with stirring to the second mixture. 2.13 parts of a 50% sodium hydroxide solution were added to the second mixture. The two mixtures were combined with the result being the formation of a gel. The gel was homogenized by stirring. The SiO₂ to methyl green mole ratio was 19.04. The SiO₂ to Al mole ratio was 10.12. The SiO₂ to water mole ratio was 0.159. The SiO₂ to NaOH mole ratio was 3.37. The gel was placed in a Teflon lines stainless steel bomb. The bomb was placed in an oven at a temperature of 150° C. for 23 days. The solids were recovered from the mother liquor by filtering. The solids were washed in water and acetone to remove the excess mother liquor and dye, then dried in air. The crystalline solids had a mordenite structure. The elemental analysis for these crystalline solids was as follows: 33% Si; 3.5% Al; 4.1% Na; and 2.0% Zn. The mole ratios were: Si/Al=9.1; SiO₂/Al₂O₃=18.25; Si/Na=6.6; SiO₂/Na₂O=13.2; Si/Zn=38.5; and SiO₂/ZnO=38.5. Carbon and nitrogen analysis indicated that the synthesized solids contained 1.88% methyl green, which was equivalent to a Si/dye mole ratio of 355 or 0.14 dye molecules per unit cell of mordenite. The crystalline mordenite, which was in excess of 95%, exhibited the following significant lines in its X-ray diffraction pattern.

| Interplanar Spacing d(A) | Relative Intensity |
| --- | --- |
| 13.50 | m. |
| 10.16 | m. |
| 9.04 | s. |
| 6.55 | s. |
| 6.35 | m. |
| 6.04 | m. |
| 5.77 | m. |
| 5.01 | w. |
| 4.50 | m. |
| 4.13 | w. |
| 3.97 | s. |
| 3.87 | w. |
| 3.82 | m. |
| 3.74 | m. |
| 3.61 | w. |
| 3.52 | w. |
| 3.46 | v.s. |
| 3.37 | s. |
| 3.20 | m. |
| 3.14 | w. |
| 2.92 | w. |
| 2.88 | m. |
| 2.69 | w. |
| 2.54 | w. |
| 2.51 | w. |
| 2.45 | w. |

EXAMPLE 7

20.4 parts of Ludox AS-40 were added to a polypropylene beaker to provide a first mixture. 2.07 parts of methyl green were mixed with 7 parts of water in another polypropylene beaker to form a second mixture. 1.45 parts of NaAlO₂.1.5H₂O were added with stirring to the second mixture. 2.13 parts of a 50% sodium hydroxide solution were added to the second mixture. The two mixtures were mixed together with the result being the formation of a gel. The gel was stirred to homogenize the gel. The SiO₂ to methyl green mole ratio was 19.4. The SiO₂ to Al mole ratio was 10.12. The SiO₂ to water mole ratio was 0.159. The SiO₂ to NaOH mole ratio was 3.37. Two 16 part samples of the gel were placed in Teflon-lined stainless steel bombs. The bombs were placed in an oven at a temperature of 150° C. The samples were removed after 28 days and 35 days. The solids were recovered from the mother liquor by filtering. The solids were washed in water and acetone to remove excess dye, then dried in air. These samples had a mordenite structure.

EXAMPLE 8

The crystalline solids recovered from the 28-day sample of Example 7 were heat treated in air at 500° C. for four hours. The heat treated solids had the following elemental analysis: 38% Si; 3.6% Al; 4.2% Na; and 2.1% Zn. These solids had the following mole ratios: Si/Al=10.15; SiO₂/Al₂O₃=20.3; Si/Na=8.65; SiO₂/Na₂O=17.3; Si/Zn=42.2; and SiO₂/ZnO=42.2. These solids exhibited the following X-ray diffraction pattern:

| Interplanar Spacing d(A) | Relative Intensity |
| --- | --- |
| 13.5 | m. |
| 10.2 | w. |
| 9.0 | s. |
| 6.55 | s. |
| 6.32 | w. |
| 6.04 | w. |
| 5.79 | w. |
| 5.02 | w. |
| 4.50 | m. |
| 4.13 | w. |
| 3.97 | s. |
| 3.83 | w. |
| 3.75 | w. |
| 3.61 | w. |
| 3.52 | w. |
| 3.47 | v.s. |
| 3.39 | s. |
| 3.22 | m. |
| 3.14 | w. |
| 2.93 | w. |
| 2.88 | m. |
| 2.69 | w. |
| 2.55 | w. |
| 2.51 | w. |
| 2.46 | w. |

EXAMPLE 9

The heat treated mordenite from Example 8 adsorbed 4.1% benzene at a benzene partial pressure of 70 Torr and ambient temperature. The heat treated mordenite also adsorbed 0.16 cubic centimeters of $O_2$ per gram of mordenite at $-196°$ C. and an oxygen partial pressure of 100 Torr.

While the invention has been explained in relation to its preferred embodiment, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method for making molecular sieving high silica mordenite using a nitrogen-containing organic dye, said mordenite being represented in terms of mole ratios of oxides by the formula

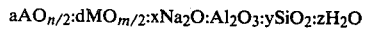

$$aAO_{n/2}:dMO_{m/2}:xNa_2O:Al_2O_3:ySiO_2:zH_2O$$

wherein
A is the cation of said organic dye;
M is selected from the group consisting of Zn, Cd, Hg, Ga, Pd, Pt, Fe, Cr, Mn, Co, Ni or a mixture of two or more thereof;
n is the ionic charge of A and m is the ionic charge of M;
a is from zero to about 1;
d is from zero to about 1;
x is from about 0.5 to about 2;
y is from about 10 to about 100; and
z is from zero to about 20;
the X-ray diffraction pattern for said high silica mordenite showing the following significant lines:

| Interplanar Spacing d(A) | Relative Intensity |
| --- | --- |
| 13.6 + 0.2 | m. |
| 10.2 + 0.15 | w.-m. |
| 9.10 + 0.10 | s. |
| 6.60 + 0.10 | s. |
| 6.35 + 0.08 | w.-m. |
| 6.04 + 0.08 | w. |
| 5.80 + 0.06 | w.-m. |
| 5.02 + 0.05 | w. |
| 4.52 + 0.05 | m.-s. |
| 3.99 + 0.05 | m.-s. |
| 3.85 + 0.05 | w.-m. |
| 3.75 + 0.05 | w.-m. |
| 3.47 + 0.04 | v.s. |
| 3.39 + 0.04 | s. |
| 3.21 + 0.04 | m.-s. |
| 2.88 + 0.03 | m. |
| 2.51 + 0.02 | w. | said process comprising the following steps:
(A) providing a mixture comprising: water; an oxide of silicon source; an oxide of aluminum source; a mineralizing agent selected from the group consisting of alkali and alkaline earth metal compounds of oxides, hydroxides, organic salts, nitrates, phosphates, halides or carbonates; and said nitrogen containing organic dye; the mole ratio of $OH^-$ to Si being in the range of about 0.1 to about 10, the mole ratio of Si to Al being in the range of about 5 to about 50, the mole ratio of Si to mineralizing agent being in the range of about 0.1 to about 50, and the mole ratio of Si to organic dye being in the range of about 5 to about 100;

said organic dye being represented by the formula

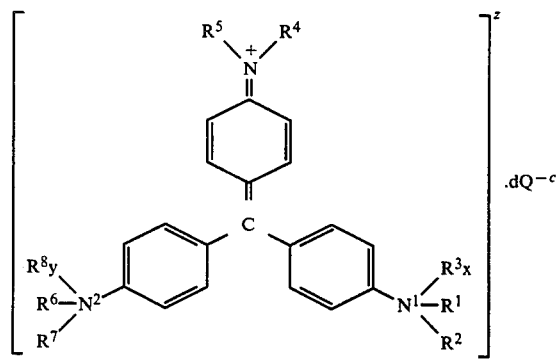

wherein
$N^1$ has a charge of $+1$ or a neutral charge;
$N^2$ has a charge of $+1$ or a neutral charge;
x is zero when $N^1$ has a neutral charge, and is 1 when $N^1$ has a $+1$ charge;
y is zero when $N^2$ has a neutral charge, and is 1 when $N^2$ has a $+1$ charge;
$R^1, R^2, R^3, R^4, R^5, R^6$ and $R^7$ are independently hydrogen or alkyl groups of 1 to about 10 carbon atoms;
z is $1+x+y$;
Q is an anion of charge c; and
d is z/c;
or said organic dye being the salt of a cation of the formula

wherein
R⁹ and R¹⁰ are independently hydrocarbon groups of from 1 to about 10 carbon atoms; and (B) maintaining said mixture at a temperature of about 80° C. to about 300° C. for an effective period of time to provide said mordenite.

2. The method of claim 1 wherein a is from zero to about 0.2.

3. The method of claim 1 wherein d is from about 0.05 to about 1.

4. The method of claim 1 wherein d is from about 0.1 to about 0.5.

5. The method of claim 1 wherein x is from about 0.8 to about 1.5.

6. The method of claim 1 wherein y is from about 12 to about 40.

7. The method of claim 1 wherein the mole ratio of Si to Al for said mordenite is in the range of about 6 to about 20.

8. The method of claim 1 wherein the mixture provided for in step (A) is a gel, said gel being prepared by (i) providing a first mixture comprising water and a source of silica, (ii) providing a second mixture comprising water, a source of an oxide of aluminum, said organic dye and said mineralizing agent, and (iii) combining said first and second mixture to provide said gel.

9. The method of claim 1 wherein said organic dye is selected from the group consisting of methyl green, ethyl green, methyl violet, methyl violet 2B, methyl viologen, ethyl viologen, benzyl viologen and betaine viologen.

10. The method of claim 1 wherein $R^1$, $R^4$, $R^5$ and $R^6$ are methyl.

11. The method of claim 1 wherein $R^2$ and $R^7$ are independently hydrogen, methyl or ethyl.

12. The method of claim 1 wherein $R^3$ and $R^8$ are methyl.

13. The method of claim 1 wherein Q is a halide, phosphate, nitrate, carbonate, acetate, formate or butyrate.

14. The method of claim 1 wherein Q is represented by the formula $EX_4$ wherein E is selected from the group consisting of Al, Zn, Cd, Hg, Ga, Pd, Pt, Fe, Cr, Mn, Co or Ni, and X is selected from the group consisting of Cl, F, Br, I or CN.

15. The method of claim 1 wherein R⁹ and R¹⁰ are independently aliphatic or aromatic.

16. The method of claim 1 wherein R⁹ and R¹⁰ are alkyl groups of 1 to about 10 carbon atoms.

17. The method of claim 1 wherein R⁹ and R¹⁰ are benzyl.

18. The method of claim 1 wherein R⁹ and R¹⁰ are each methyl.

19. The method of claim 1 wherein said oxide of silicon source comprises silica.

20. The method of claim 1 wherein said oxide of silicon source comprises a colloidal dispersion of silica.

21. The method of claim 1 wherein said oxide of aluminum source is sodium aluminate.

22. The method of claim 1 wherein said mineralizing agent is a sodium-containing compound.

23. The method of claim 1 with the step of separating said mordenite from its mother liquor.

24. The method of claim 1 with the step of washing said mordenite.

25. The method of claim 1 with the step of heat treating said mordenite in an inert, oxidizing or reducing atmosphere.

26. The method of claim 25 with the step of cation exchanging said heat treated mordenite with an ammonium salt or a salt of a catalytically active metal to provide a cation exchanged mordenite.

27. The method of claim 26 with the step of heat treating said cation exchanged mordenite in an inert, oxidizing or reducing atmosphere.

28. The method of claim 1 wherein the mole ratio during step (A) of $H_2O$ to $OH^-$ is in the range of about 10 to about 1000.

29. The method of claim 1 wherein the mole ratio of Si to said organic dye during step (A) is in the range of about 10 to about 60.

30. The method of claim 1 wherein said mixture is maintained in an enclosed container under at least the vapor pressure of water during step (B).

31. The method of claim 1 wherein the temperature during step (B) is in the range of about 100° C. to about 200° C.

32. The method of claim 1 wherein the time period for step (B) is from about 1 to about 100 days.

33. The method of claim 1 wherein the time period for step (B) is from about 10 to about 50 days.

* * * * *